United States Patent
Bi et al.

(10) Patent No.: US 11,981,592 B2
(45) Date of Patent: May 14, 2024

(54) BIOLOGICAL NITROGEN REMOVAL METHOD BASED ON MULTISTAGE FEEDING AND MULTISTAGE ANOXIC/AEROBIC CHAMBERS FOR WASTEWATER TREATMENT AT LOW TEMPERATURE

(71) Applicant: QINGDAO UNIVERSITY OF TECHNOLOGY, Shandong (CN)

(72) Inventors: Xuejun Bi, Qingdao (CN); Xiaolin Zhou, Qingdao (CN); Peng Song, Qingdao (CN); Xiaodong Wang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 403 days.

(21) Appl. No.: 17/430,812

(22) PCT Filed: Oct. 27, 2020

(86) PCT No.: PCT/CN2020/124101
§ 371 (c)(1),
(2) Date: Aug. 13, 2021

(87) PCT Pub. No.: WO2021/223377
PCT Pub. Date: Nov. 11, 2021

(65) Prior Publication Data
US 2022/0306504 A1    Sep. 29, 2022

(30) Foreign Application Priority Data
May 7, 2020  (CN) .......................... 202010376382.3

(51) Int. Cl.
*C02F 3/30*      (2023.01)
*C02F 3/08*      (2023.01)
(Continued)

(52) U.S. Cl.
CPC ............... *C02F 3/305* (2013.01); *C02F 3/08* (2013.01); *C02F 3/302* (2013.01);
(Continued)

(58) Field of Classification Search
CPC .. C02F 3/305; C02F 3/08; C02F 3/302; C02F 2101/16; C02F 2101/30; C02F 2101/38;
(Continued)

(56) References Cited

U.S. PATENT DOCUMENTS 3,994,802 A * 11/1976 Casey ........................ C02F 3/12
                                                              210/903
2009/0071900 A1* 3/2009 Kulick, III .............. C02F 3/302
                                                              210/150
(Continued)

FOREIGN PATENT DOCUMENTS

CA        2567435 A1 *  5/2008
CN       105923906 A    9/2016
(Continued)

OTHER PUBLICATIONS

Machine-generated English translation of TW M507424, generated on Nov. 15, 2023.*
(Continued)

*Primary Examiner* — Fred Prince
(74) *Attorney, Agent, or Firm* — Oliff PLC

(57) ABSTRACT

A biological nitrogen removal method based on multistage feeding and anoxic/aerobic chambers for adopting a constant flow operation mode, enabling wastewater subjected to primary treatment to enter a first-stage and a second-stage A/O reaction units from two position points; lifting and refluxing an effluent to an influent end of the first-stage units; lifting and refluxing an effluent to an influent end of the second-stage units; and clarifying, separating and discharging an effluent from an outlet end of a third-stage A/O (Continued)

reaction unit. The wastewater treatment mode combines a process based on two-stage wastewater feeding and three-stage anoxic/aerobic chambers with biofilms in different reaction zones, =optimizing and controlling a reflux ratio of each segment according to an amount of organic matters available for denitrification in influent, reducing the impact of hydraulic loading at the cross section in the reactors while removing organic matters and nitrogen-containing pollutants at a low temperature.

8 Claims, 1 Drawing Sheet

(51) Int. Cl.
    *C02F 101/16*     (2006.01)
    *C02F 101/30*     (2006.01)
    *C02F 101/38*     (2006.01)

(52) U.S. Cl.
    CPC ...... *C02F 2101/16* (2013.01); *C02F 2101/30* (2013.01); *C02F 2101/38* (2013.01); *C02F 2209/15* (2013.01); *C02F 2301/043* (2013.01); *C02F 2301/08* (2013.01); *C02F 2301/10* (2013.01)

(58) Field of Classification Search
    CPC ............ C02F 2209/15; C02F 2301/043; C02F 2301/08; C02F 2301/10

USPC ....... 210/605, 610, 611, 615, 616, 617, 622, 210/903, 908

See application file for complete search history.

(56) References Cited

U.S. PATENT DOCUMENTS

| | | | |
|---|---|---|---|
| 2011/0284461 A1* | 11/2011 | DiMassimo | C02F 3/308 210/616 |
| 2017/0369350 A1* | 12/2017 | Chen | C02F 3/302 |
| 2021/0206677 A1* | 7/2021 | Yatsugi | C02F 3/1273 |

FOREIGN PATENT DOCUMENTS

| | | |
|---|---|---|
| CN | 105948251 A | 9/2016 |
| CN | 110386732 A | 10/2019 |
| CN | 111533258 A | 8/2020 |
| CN | 111533259 A | 8/2020 |
| TW | M507424 U * | 8/2015 |
| WO | 2020/071173 A1 | 4/2020 |

OTHER PUBLICATIONS

Feb. 4, 2021 International Search Report issued in International Patent Application No. PCT/CN2020/124101.

Feb. 4, 2021 Written Opinion issued in International Patent Application No. PCT/CN2020/124101.

* cited by examiner

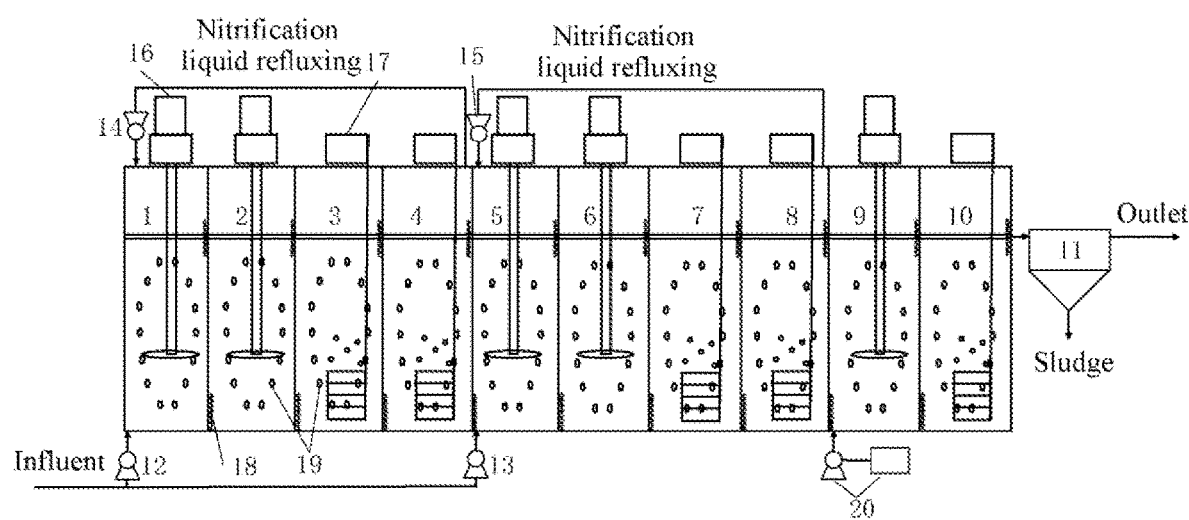

BIOLOGICAL NITROGEN REMOVAL METHOD BASED ON MULTISTAGE FEEDING AND MULTISTAGE ANOXIC/AEROBIC CHAMBERS FOR WASTEWATER TREATMENT AT LOW TEMPERATURE

BACKGROUND

Technical Field

The invention provides a method for wastewater treatment combining a process based on multistage feeding and multistage anoxic/aerobic chambers with biofilms in different functional reaction zones. The invention belongs to the technical field of wastewater treatment.

Related Art

At present, traditional biological wastewater treatment would hardly achieve the increasingly stringent requirement of the treated wastewater discharging standards at wastewater treatment plants (WWTPs). The traditional nitrogen removal process is facing even more serious challenges to remove more nitrogen contents at a low temperature. In order to improve the biological nitrogen removal efficiency of WWTPs at a low temperature, a traditional activated sludge system using single-stage or multi-stage anoxic/aerobic (A/O) processes requires much longer sludge age and theoretical hydraulic retention time to ensure the quantity of nitrogen removal biomass in the activated sludge, which in the meanwhile requires higher dissolved oxygen level by increasing the air flow to maintain the activity of the nitrobacteria. Therefore, larger biochemical reactors are usually necessary, although they require higher capital investment on constructing civil works. Moreover, the operational cost in terms of energy consumption is high because higher quantity of air needs to be transported to the aeration tank, which is contradicted with the green production and green life actions.

The activated sludge system with single-stage or multi-stage A/O processes would expose activated sludge to anoxic/aerobic environment alternately which is not suitable for culturing bacteria with specific functionality. Besides, the nitrification performance of conventional single- or multi-stage activated sludge system is limited at a low temperature which is also the bottleneck for the application of the conventional activated sludge system. Therefore, an efficient biological nitrogen removal technology for urban wastewater capable of meeting the requirement of higher water quality is urgently needed.

SUMMARY

To overcome the defects of existing biological nitrogen and phosphorus removal technologies for wastewater treatment and meet the need for an efficient nitrogen removal technology for urban wastewater treatment, the invention provides a biological nitrogen removal method based on multistage feeding and multistage anoxic/aerobic chambers for wastewater treatment at a low temperature, which can solve the bottleneck that the nitrification performance of conventional single- or multi-stage activated sludge system is limited at a low temperature (6 to 15° C.) in winter and solve the inefficient biological nitrogen removal, and can meet the stringent requirements in wastewater discharging standards of different geographical regions, particularly at a low-temperature.

The biological nitrogen removal method based on multistage feeding and multistage anoxic/aerobic chambers for wastewater treatment at a low temperature of the invention adopts the following technical solution:

adopting a constant flow operation mode: enabling influent subjected to primary treatment (outlet water from a sedimentation tank) to respectively enter a first-stage A/O reaction unit and a second-stage A/O reaction unit from two position points; refluxing an effluent from an outlet end of the first-stage A/O reaction unit to an influent end of the first-stage A/O reaction unit at a reflux ratio of 50% to 200%; refluxing an effluent from an outlet end of the second-stage A/O reaction unit to an influent end of the second-stage A/O reaction unit at a reflux ratio of 50% to 200%; and clarifying, separating and discharging an effluent from an outlet end of a third-stage A/O reaction unit.

The first-stage A/O reaction unit includes four sequentially connected biofilm reactors:

an A1 anoxic influent carbon source denitrification reactor, an A2 anoxic influent carbon source denitrification reactor, an O3 aerobic organic matter degradation reactor and an O4 aerobic nitrification reactor.

The second-stage A/O reaction unit includes four sequentially connected biofilm reactors: an A5 anoxic influent carbon source denitrification reactor, an A6 anoxic influent carbon source denitrification reactor, an O7 aerobic organic matter degradation reactor and an O8 aerobic nitrification reactor.

The third-stage A/O reaction unit includes two sequentially connected biofilm reactors: an A9 anoxic external carbon source denitrification reactor and an O10 aerobic residual organic matter degradation and nitrification reactor. A carbon source adding device is disposed in the A9 anoxic external carbon source denitrification reactor.

Suspended biofilm carriers (suspended filling materials) are disposed in all the reactors.

In the anoxic reactors of the first-stage reaction unit and the second-stage reaction unit, facultative heterotrophic biofilms attached to surfaces of the suspended biofilm carriers remove nitrate nitrogen through influent carbon source denitrification; in the first-stage reaction unit and the second-stage reaction unit, in the aerobic reactors mainly for organic matter degradation, aerobic heterotrophic biofilms attached to surfaces of the suspended biofilm carriers remove organic matters in wastewater; in the aerobic reactors mainly for ammonia-nitrogen nitrification, aerobic autotrophic biofilms attached to surfaces of the suspended biofilm carriers remove organic nitrogen and ammonia nitrogen in wastewater; and in the third-stage reaction unit, nitrate nitrogen is removed by adding an external carbon source according to a total nitrogen discharge criterion for finally treated outlet water, so that the organic matters, total nitrogen and ammonia nitrogen of the finally treated outlet water reach the water quality indexes.

A reflux ratio of refluxing the effluent from the outlet ends of the first-stage A/O reaction unit and the second-stage A/O reaction unit to the influent ends of the first-stage A/O reaction unit and the second-stage A/O reaction unit is 50% to 200%.

A total hydraulic retention time of the three stages of A/O reaction units is 6 to 12 h, and a maximum flow velocity at a cross section of each of the reactors is not higher than 35 m/h.

A stirrer is disposed in each of the anoxic reactors (A1, A2, A5, A6 and A9), and a filling rate of the suspended biofilm carriers in the anoxic reactors suitable for anoxic environment microbes to attach and grow is not higher than 55%.

An aeration device is disposed in each of the aerobic reactors (O3, O4, O7, O8 and O10), and a filling rate of the suspended biofilm carriers in the aeration reactors suitable for microbes to attach and grow is not higher than 66%.

The reactors (A1 to O10) are each equipped with an influent distribution device and an outlet water collecting device, the influent distribution device receives water through a weir port on its upper part, or is of a submerged structure which receives water from the bottom of a side surface of the reactor, and correspondingly the outlet water collecting device collects water near the bottom or the top of a side surface of the reactor behind a filling material interception screen, with a top-in bottom-out or bottom-in top-out mode being adopted.

The reactors (A1 to O10) are each equipped with an effluent suspended biofilm carrier interception device. The suspended biofilm carrier interception device can use a vertical or horizontal cylindrical screen. When the vertical screen is used, an apertured side of the screen is located at a position which is 35% to 65% of the effective depth of the tank body. When the horizontal cylindrical screen is used, an installing height of the cylindrical screen is located at a position which is 35% to 65% of the effective depth of the tank body. A maximum screening flow velocity of the interception screen is not higher than 60 m/h, an open area of the interception screen is not higher than 50%, and a mesh size of the interception screen is 50% to 60% of a diameter of the suspended biofilm carriers.

In the first-stage A/O reaction unit, the A1 anoxic influent carbon source denitrification reactor and the A2 anoxic influent carbon source denitrification reactor are a pre-denitrification zone which uses electron donor matrixes provided by the organic matter carbon source in influent for denitrification, and nitrate nitrogen is removed through facultative heterotrophic biofilms attached to surfaces of the suspended biofilm carriers in the reactors. The A2 anoxic influent carbon source denitrification reactor is used as a supplementation for the A1 anoxic influent carbon source denitrification reactor so as to ensure the sufficient and thorough pre-denitrification reaction. In this process, nitrate nitrogen carried in reflux nitrification liquid of the O4 aerobic nitrification reactor is removed. Organic matters in the wastewater entering the O3 aerobic organic matter degradation reactor are removed by aerobic heterotrophic biofilms attached to surfaces of the suspended biofilm carriers in the O3 aerobic organic matter degradation reactor so as to enable the subsequent aerobic reaction zone to be in a low-organic-load state. Organic nitrogen and ammonia nitrogen in wastewater entering the O4 aerobic nitrification reactor are removed through aerobic autotrophic biofilms attached to surfaces of the suspended biofilm carriers in the O4 aerobic nitrification reactor, and the nitrification reaction efficiency is improved.

In the second-stage A/O reaction unit, the A5 anoxic influent carbon source denitrification reactor and the A6 anoxic influent carbon source denitrification reactor are also pre-denitrification zones which also use electron donor matrixes provided by the organic matter carbon source in influent for denitrification to remove nitrate nitrogen. Additionally, the A6 anoxic influent carbon source denitrification reactor is also used as a supplementation for the A5 anoxic influent carbon source denitrification reactor so as to ensure the sufficient and thorough pre-denitrification reaction. In this process, nitrate nitrogen carried in reflux nitrification liquid of the O8 aerobic nitrification reactor and nitrate nitrogen carried in effluent nitrification liquid of the O4 aerobic nitrification reactor in the first-stage A/O reaction unit are removed together. Organic matters in the wastewater entering the O7 aerobic organic matter degradation reactor are removed by aerobic heterotrophic biofilms attached to surfaces of the suspended biofilm carriers in the O7 aerobic organic matter degradation reactor so as to enable the subsequent O8 aerobic nitrification reactor to be in a low-organic-load state. Organic nitrogen and ammonia nitrogen in wastewater entering the O8 aerobic nitrification reactor are removed through aerobic autotrophic biofilms attached to surfaces of the suspended biofilm carriers in the O8 aerobic nitrification reactor. Through a strong hydraulic shearing effect caused by hydraulic load increase of this reaction unit, biofilm growth is reinforced, the metabolic activity of the biofilms is improved, the mass transfer efficiency of oxygen gas and matrixes is improved, high-activity biofilms are formed on the surfaces of the suspended biofilm carriers in the O7 aerobic organic matter degradation reactor and the O8 aerobic nitrification reactor, and the nitrification operation stability of the system is improved.

In the third-stage A/O reaction unit, an external carbon source is added to the A9 anoxic external carbon source denitrification reactor as an electron donor matrix for denitrification. In this reaction process, according to a total nitrogen discharge criterion for finally treated outlet water, a nitrate nitrogen removal amount is controlled by adjusting an amount of the external carbon source to be added. The O10 aerobic residual organic matter degradation and nitrification reactor has a main function of degrading and removing residual external carbon source organic matters added into the A9 anoxic external carbon source denitrification reactor, and is also used as a supplementation for the first two segments of nitrification reactions in the meanwhile, so as to ensure the control on the water quality indexes such as the organic matters, total nitrogen and ammonia nitrogen of the finally treated outlet water according to the design requirements.

The invention combines a process based on multistage feeding and multistage anoxic/aerobic chambers with biofilms in different functional reaction zones. Through a design of a plurality of reactors in each unit, specific functionality is realized, so that the operation of the multistage A/O process is combined with the biofilms in different functional reaction zones. Through addition of the external carbon source into post-denitrification anoxic reactors, the total nitrogen of outlet water can be optimized and controlled, thereby achieving efficient nitrogen removal.

The invention has the following prominent characteristics:

1. With the wastewater treatment mode combining a process based on two-stage wastewater feeding and three-stage anoxic/aerobic chambers with biofilms in different functional reaction zones, this method can optimize and control a reflux ratio of each segment according to an amount of organic matters available for denitrification in influent, to reduce the impact of the possible hydraulic loading at the cross section in the reactors while ensuring the effect of nitrogen removal by denitrification.
2. With the two-stage wastewater feeding mode and the serial connection of the reactors, the distribution of the organic load and the ammonia nitrogen load in space is optimized, providing a favorable condition for the efficient removal of organic matters and nitrification in the system, and in the meanwhile, the utilization efficiency of the pre-denitrification carbon source of the system and the nitrogen removal capability of the carbon source in the system are improved.

3. Through different reaction zones and control of reaction conditions, biofilms adapting to substances to be removed in the corresponding reaction zones and the corresponding treatment criteria can be formed, imparting the system with a high ability to remove nitrogen by bio-nitrification and denitrification.

4. Through addition of the external carbon source into the post-denitrification anoxic reactors, the total nitrogen of outlet water of the system can be optimized and controlled, thereby achieving efficient nitrogen removal.

5. With the use of biofilms in place of activated sludge, the suspended matter concentrations (SS) in the outlet water of the three stages of A/O reactors are only 50 to 200 mg/L, the biofilm microbial yield and the system sludge yield are significantly reduced, and a traditional secondary sedimentation tank and MBR film filtration technology adopted by an activated sludge method can be replaced with efficient sludge water clarification and separation technologies such as an air floatation tank, a high-density sedimentation tank, magnetic flocculation separation, screen filtration and multimedia filtration.

6. The invention is particularly applicable to wastewater treatment at a low temperature to meet the stringent requirements in wastewater discharging standards, and can achieve efficient removal of organic matters and nitrogen-containing pollutants.

Under the condition that the reflux ratios of the invention at the first two stages of aerobic nitrification liquid are both 100% (based on the flow rate of wastewater entering each reaction unit), that is, the total reflux ratio of the aerobic nitrification liquid is only 100% (based on the total influent flow rate of the treatment system), the total nitrogen removal rate reaches 82.49±2.36%, and the pre-denitrification nitrogen removal rate can reach about 66%. In a case using a single-stage A/O wastewater treatment mode, under the condition that the reflux ratio of the aerobic nitrification liquid is 100% (based on the total influent flow rate of the treatment system), a theoretical total nitrogen removal rate can reach 50%, and a minimum reflux ratio of the aerobic nitrification liquid needs to reach 456% in order to obtain a total nitrogen removal rate of at least 82%.

Data show that the biological nitrogen removal method based on two-stage feeding and three-stage anoxic/aerobic chambers for wastewater treatment can reach an ammonia nitrogen removal rate of 99.51±0.41% at a low temperature without sludge reflux, and well solves the problem of low-temperature nitrification. In the meanwhile, with a lower aerobic nitrification reflux ratio, the utilization rate of the wastewater carbon source and the pre-denitrification efficiency are significantly improved, which greatly reduces the energy consumption required for refluxing of the aerobic nitrification liquid in the system, thereby achieving efficient biological nitrogen removal for urban wastewater.

BRIEF DESCRIPTION OF THE DRAWINGS

FIG. 1 is a schematic diagram of a system for realizing a biological nitrogen removal method based on multistage feeding and multistage anoxic/aerobic chambers for wastewater treatment of the invention.

In the drawings, 1 denotes an A1 anoxic influent carbon source denitrification reactor, 2 denotes an A2 anoxic influent carbon source denitrification reactor, 3 denotes an O3 aerobic organic matter degradation reactor, 4 denotes an O4 aerobic nitrification reactor, 5 denotes an A5 anoxic influent carbon source denitrification reactor, 6 denotes an A6 anoxic influent carbon source denitrification reactor, 7 denotes an O7 aerobic organic matter degradation reactor, 8 denotes an O8 aerobic nitrification reactor, 9 denotes an A9 anoxic external carbon source denitrification reactor, 10 denotes an O10 aerobic residual organic matter degradation and nitrification reactor, 11 denotes a sludge water clarification and separation unit, 12 denotes a first-stage influent lifting pump, 13 denotes a second-stage influent lifting pump, 14 denotes a first-stage nitrification liquid refluxing pump, 15 denotes a second-stage nitrification liquid refluxing pump, 16 denotes a stirrer, 17 denotes an aeration device, 18 denotes a suspended biofilm carrier interception device, 19 denotes suspended biofilm carriers, and 20 denotes a carbon source adding device.

DETAILED DESCRIPTION

The invention effectively removes nitrogen from wastewater by combining a process based on multistage feeding and three-stage anoxic/aerobic chambers with biofilms in different functional reaction zones. A used system is as shown in FIG. 1, and consists of three stages of sequentially connected A/O reaction units and a sludge water clarification and separation unit 11.

The first-stage A/O reaction unit consists of four biofilm reactors: an A1 anoxic influent carbon source denitrification reactor 1, an A2 anoxic influent carbon source denitrification reactor 2, an O3 aerobic organic matter degradation reactor 3 and an O4 aerobic nitrification reactor 4. A first-stage nitrification liquid refluxing pump 14 is disposed in an outlet well (or a pipe tunnel) behind an effluent screen at a tail end of the first-stage A/O reaction unit, and effluent mixed liquid of the O4 aerobic nitrification reactor is refluxed into the A1 anoxic influent carbon source denitrification reactor 1, with a reflux ratio of 50% to 200%.

A second-stage A/O reaction unit consists of four biofilm reactors: an A5 anoxic influent carbon source denitrification reactor 5, an A6 anoxic influent carbon source denitrification reactor 6, an O7 aerobic organic matter degradation reactor 7 and an O8 aerobic nitrification reactor 8. A second-stage nitrification liquid refluxing pump 15 is disposed in an outlet well (or a pipe tunnel) behind an effluent screen at a tail end of the second-stage A/O reaction unit, and effluent mixed liquid of the O8 aerobic nitrification reactor 8 is refluxed into the A5 anoxic influent carbon source denitrification reactor 5, with a reflux ratio of 50% to 200% (based on the flow rate of influent entering the reaction unit).

The third-stage A/O reaction unit consists of two biofilm reactors: an A9 anoxic external carbon source denitrification reactor 9 and an O10 aerobic residual organic matter degradation and nitrification reactor 10. A carbon source adding device 20 is disposed in the A9 anoxic external carbon source denitrification reactor 9. A nitrate nitrogen monitoring instrument is disposed in the O8 aerobic nitrification reactor 8, and the carbon source addition of the A9 anoxic external carbon source denitrification reactor is automatically controlled according to the monitored nitrate nitrogen concentration.

Each of the reactors (A1 to O10) can use a cylindrical or rectangular tank body with an effective depth of 4 to 10 m, where a diameter-to-depth ratio of the cylindrical tank bodies is 2:1 to 0.5:1, and a length-to-width ratio of the rectangular tank bodies is 0.5:1 to 1.5:1. The reactors (A1 to O10) are each equipped with an influent distribution device and an outlet water collecting device. The influent distribution device receives water through a weir port on its upper part, or is of a submerged structure which receives water from the bottom of a side surface of the reactor, and correspondingly the outlet water collecting device collects water near the bottom or the top of a side surface of the reactor behind a suspended biofilm carrier interception screen 18, with a top-in bottom-out or bottom-in top-out mode being adopted. The reactors (A1 to O10) are each equipped with an effluent suspended biofilm carrier interception device 18. The effluent suspended biofilm carrier interception device can use a vertical or horizontal cylindrical screen. When the vertical screen is used, an apertured side of the screen is located at a position which is 35% to 65% of the effective depth of the tank body. When the horizontal cylindrical screen is used, an installing height of the cylindrical screen is located at a position which is 35% to 65% of the effective depth of the tank body. A maximum screening flow velocity of the interception screen is not higher than 60 m/h, an open area of the interception screen is not higher than 50%, and a mesh size of the interception screen is 50% to 60% of a diameter of the suspended biofilm carriers (suspended filling materials).

A stirrer 16 is disposed in each of all the anoxic reactors (A1, A2, A5, A6 and A9), the suspended biofilm carriers (suspended filling materials) 19 suitable for anoxic environment microbes to attach and grow are provided, and a filling rate of the filling materials is not higher than 55%. The stirrer 16 is preferably a spiral or hyperboloidal stirrer, with a stirring input power not lower than 25 W/m$^3$.

An aeration device 17 is disposed in each of all the aerobic reactors (O3, O4, O7, O8 and O10), the suspended biofilm carriers suitable for microbes to attach and grow are provided, and a filling rate of the filling materials is not higher than 66%. The aeration device 17 is preferably a perforated pipe for aeration, which has a denser distribution of aeration holes at its end near the outlet end. The aeration holes of the perforated pipe have a diameter 3 to 4 mm, with an aeration rate of 1.60 to 1.75 m$^3$/h at the opening of the aeration hole. A horizontal installation error of the perforated pipe is not greater than 6.5 mm.

The sludge water clarification and separation unit 11 can select efficient sludge water clarification and separation technologies such as an air floatation tank, a high-density sedimentation tank, magnetic flocculation separation, screen filtration and multimedia filtration, and has the main effect of removing suspended solids such as fallen biofilms and performing chemical phosphorus removal through chemical addition according to the phosphorus discharge requirement of finally treated outlet water.

A total theoretical retention time of the three stages of A/O reaction units is 6 to 12 h, and a maximum flow velocity at a cross section of each of the reactors is not higher than 35 m/h.

The invention adopts a constant flow operation mode, where the wastewater is subjected to existing primary treatment such as a grille, an aeration desilting basin and a primary sedimentation tank and is then subjected to secondary treatment of the invention.

Outlet water after primary treatment on influent respectively enters the A1 reactor 1 at the front end of the first-stage A/O reaction unit and the A5 reactor 5 at the front end of the second-stage A/O reaction unit from two position points. An effluent of the reactor at the tail end of the first-stage A/O reaction unit is lifted to the influent end of the first-stage A/O reaction unit through the first-stage nitrification liquid refluxing pump 14, i.e., effluent mixed liquid of the O4 reactor is refluxed into the A1 reactor 1. An effluent of the reactor at the tail end of the second-stage A/O reaction unit is lifted to the influent end of the second-stage A/O reaction unit through the second-stage nitrification liquid refluxing pump 15, i.e., effluent mixed liquid of the O8 reactor 8 is refluxed into the A5 reactor 5. An effluent of the reactor at the tail end of the third-stage A/O reaction unit enters the sludge water clarification and separation unit 11 through the O10 reactor 10, and water is finally discharged after clarification and separation.

Through intercepting the suspended biofilm carriers 19 by the interception screen 18, microbes attached to and growing on the surfaces of the suspended biofilm carriers 19 in each of the reactors are in a fast growing state, and naturally form the biofilms adapting to the functions of the reaction zones, i.e., the biofilms are always in an aerobic zone or always in an anoxic zone, and biofilms adapting to the aerobic zone or anoxic zone environment will be formed through operation.

In the first-stage A/O reaction unit, the A1 reactor 1 and the A2 reactor 2 are a pre-denitrification zone which uses electron donor matrixes provided by an organic matter carbon source in influent for denitrification, the microbes growing and attached to the surfaces of the suspended biofilm carriers in the reactor naturally form facultative heterotrophic biofilms adapting to the reaction environment and matrix conditions and having the efficient denitrification capability, nitrate nitrogen is removed at a higher biofilm surface denitrification load rate, and the pre-denitrification reaction efficiency is favorably and effectively improved. In the meanwhile, the A2 reactor 2 is used as a supplementation for the A1 reactor 1 so as to ensure the sufficient and thorough pre-denitrification reaction. In this reaction process, nitrate nitrogen carried in reflux nitrification liquid of the O4 reactor 4 is removed. In the meanwhile, partial organic matters in the wastewater are degraded and removed as electron donor matrixes. The microbes growing and attached to the surfaces of the suspended biofilm carriers in the O3 reactor 3 naturally form aerobic heterotrophic biofilms adapting to the reaction zone organic load and having the efficient organic matter degradation capability, organic matters in the wastewater entering the O3 reactor are removed at a higher biofilm surface organic matter load rate, so as to enable the subsequent aerobic reaction zone (O4 reactor) to be in a low organic load state, the microbes growing and attached to the surfaces of the suspended biofilm carriers in the O4 reactor 4 favorably and naturally form aerobic autotrophic biofilms adapting to the reaction zone organic load and having the efficient ammonia nitrogen degradation capability, organic nitrogen and ammonia nitrogen in the wastewater entering the reactor are removed at a higher biofilm surface ammonia nitrogen load rate, and the nitrification reaction efficiency is improved.

In the second-stage A/O reaction unit, the anoxic A5 reactor 5 and the A6 reactor 6 are also a pre-denitrification zone which uses electron donor matrixes provided by the organic matter carbon source in influent for denitrification and removes nitrate nitrogen at a higher biofilm surface denitrification load rate. Additionally, the A6 reactor 6 is used as a supplementation for the A5 reactor 5 so as to ensure the sufficient and thorough pre-denitrification reaction. Different from that of the first-stage A/O reaction unit, in this reaction process, nitrate nitrogen carried in reflux nitrification liquid of the O8 reactor 8 is removed together with nitrate nitrogen carried in effluent nitrification liquid of the O4 reactor 4, the influent carbon source is sufficiently utilized, the denitrification reaction is more thorough, and the nitrogen removal efficiency is further improved. The O7 reactor 7 removes organic matters in the wastewater entering the O7 reactor 7 at a higher biofilm surface organic matter load rate, so as to enable the subsequent O8 aerobic reactor 8 to be in a low organic load state, and organic nitrogen and ammonia nitrogen in the wastewater entering the reactor are removed at a higher biofilm surface ammonia nitrogen load rate. Through a strong hydraulic shearing effect caused by hydraulic load increase of this reaction unit, biofilm growth is reinforced, the metabolic activity of the biofilms is improved, the mass transfer efficiency of oxygen gas and matrixes is improved, high-activity biofilms are formed on the surfaces of the suspended biofilm carriers in the O7 reactor 7 and the O8 reactor 8, and the nitrification operation stability of the system is improved.

In the third-stage A/O reaction unit, an external carbon source is added to the anoxic A9 reactor 9 as an electron donor matrix for denitrification through a carbon source adding system. In this reaction process, according to a total nitrogen discharge criterion for finally treated outlet water, a nitrate nitrogen removal amount is controlled by adjusting an amount of the external carbon source to be added. The O10 reactor 10 has a main function of degrading and removing residual external carbon source organic matters added into the post-denitrification zone (A9 reactor 9), and in the meanwhile, the O10 reactor 10 is also used as a supplementation for first two segments of nitrification reactions, so as to ensure the control on the water quality indexes such as the organic matters, total nitrogen and ammonia nitrogen of the finally treated outlet water according to the design requirements.

A specific implementation for urban wastewater mainly being domestic wastewater is completed according to the following steps:

(1) Biofilm Culturing of Suspended Biofilm Carriers

A certain number of new suspended biofilm carriers 19 were taken and were respectively added into each of the aerobic reactors, and the filling rate for the addition of the filling material was controlled to be 60%. After wastewater was added into each of the aerobic reactors to a normal reaction control liquid level of the reactor, the aeration device of each of the reactors was started to perform oxygenation aeration, an aeration air supply intensity was controlled not to be higher than 55 m$^3$/(m$^2$·h), and a dissolved oxygen level was 4 to 5 mg/L.

Biofilm culturing of the biofilms was performed under the above reaction conditions. Wastewater in each of the reactors was changed once per day in the first 5 days, i.e., the biofilm culturing of the biofilms was performed in each of the aerobic reactors in an operation mode of 1 cycle per day. The wastewater in each of the reactors was changed twice per day in 5th to 10th days, i.e., the biofilm culturing of the biofilms was performed in each of the aerobic reactors in an operation mode of 2 cycles per day.

The major water quality indexes of COD and ammonia nitrogen of the influent and outlet water of the reactors were detected after the 10th day, and in the meanwhile, the biofilm culturing state of the biofilms was observed. After the outlet water COD removal rate of each treatment cycle reached about 80% and the biofilm quantity reached 10 to 15 gVSS/m$^2$, the biofilm culturing of the suspended biofilm carriers was completed.

(2) Early Stage Starting

The suspended biofilm carriers 19 subjected to biofilm culturing were distributed into the 10 reactors (A1, A2, O3, O4, O5, A5, A6, O7, O8, A9 and O10) according to a principle that a filling rate of the anoxic reactors did not exceed 55% and a filling rate of the aerobic reactors did not exceed 66%.

A constant influent and outlet operation mode was adopted, an influent flow rate of the system was controlled to be 20 to 50% of a design flow rate, and the wastewater entered the A1 reactor 1 and the A5 reactor 5 at different points according to a proportion of 1:1.

The stirrers 11 in the anoxic reactors were started, so that the suspended biofilm carriers in the anoxic denitrification reactors (A1, A2, A5 and A6) could be sufficiently fluidized. The aeration devices 17 in the aerobic reactors were started so that the suspended biofilm carriers in the aerobic denitrification reactors could be sufficiently fluidized.

The first-stage nitrification liquid refluxing pump 14 and the second-stage nitrification liquid refluxing pump 15 were started, an effluent of the O4 reactor 4 was lifted and refluxed to the A1 reactor 1, and a reflux ratio was controlled to be 100%. An effluent of the O8 reactor 8 was lifted and refluxed to the A5 reactor 5, and a reflux ratio was controlled to be 100% (based on wastewater entering this section).

The carbon source adding device 20 was started, and the amount of the carbon source to be added was determined according to the total nitrogen discharge requirement of the treated outlet water, the carbon source types and the denitrification C/N. For example, by using sodium acetate as an external carbon source, an amount of nitrate nitrogen to be removed was calculated according to the total nitrogen discharge requirement, and the amount of sodium acetate to be added was controlled according to a ratio (C/N) of the amount of the external carbon source to be added to the amount of nitrate nitrogen to be removed of about 4:1.

In the meanwhile, the major water quality indexes of COD, ammonia nitrogen and nitrate nitrogen of the influent and outlet water of each of the reactors were regularly detected, and, the biofilm culturing state of the biofilms was observed. When the removal rate of the COD, ammonia nitrogen and total nitrogen of the finally treated outlet water reached about 80%, the influent flow rate and load of the system were gradually improved until the treatment system reached the specified treatment load conditions.

(3) Formal Operation

After the treatment system reached the specified treatment load conditions, the system was optimized and adjusted. The stirring intensity in each of the anoxic denitrification reactors was adjusted, and the stirring intensity was reduced as much as possible on the premise of ensuring the sufficient fluidization of the suspended biofilm carriers 19. The aeration intensity of each of the aerobic reactors was adjusted, and the dissolved oxygen level was controlled to be 5 to 6 mg/L on the premise of ensuring the sufficient fluidization of the suspended biofilm carriers 19.

The refluxing quantity of an influent pump and a nitrification liquid refluxing pump was adjusted, and the multi-stage wastewater feeding, proportion and the corresponding reflux ratio were controlled, so that a ratio of the amount of dissoluble COD of influent entering the A1 reactor 1 to the amount of nitrate nitrogen carried by the reflux nitrification liquid of the O4 reactor 4 was about 5:1, a ratio of the dissoluble COD of influent entering the A5 reactor 5 to the sum of the amount of nitrate nitrogen carried by the effluent nitrification liquid of the O4 reactor 4, and the amount of nitrate nitrogen carried by the reflux nitrification liquid of the O8 reactor 8 was about 5:1.

The carbon source adding system 20 of the A9 reactor 9 was started, the amount of the carbon source to be added was controlled according to the total nitrogen discharge criterion for finally treated outlet water. For example, by using sodium acetate as an external carbon source, an amount of nitrate nitrogen to be removed was calculated according to the total nitrogen discharge requirement, and the amount of sodium acetate to be added was controlled according to a ratio (C/N) of the amount of the external carbon source to be added to the amount of nitrate nitrogen to be removed of about 4:1. The aeration intensity of the O10 reactor was adjusted according to the water quality index results of the final outlet water, the dissolved oxygen level was controlled to be 3 to 4 mg/L on the premise of enabling the sufficient fluidization of the suspended biofilm carriers (suspended filling materials) so as to ensure the control on the water quality indexes such as the organic matters, total nitrogen and ammonia nitrogen of the finally treated outlet water according to the design requirements.

In the present embodiment, the water quality of the influent and outlet water were as follows: under the condition of reaction temperature of 8 to 15° C., the removal rates of COD, ammonia nitrogen and total nitrogen were respectively 78.60±1.43%, 99.51±0.41% and 82.49±2.36%, and concentrations of COD, ammonia nitrogen and total nitrogen in outlet water were respectively 20.97±1.51 mg/L, 0.73±0.34 mg/L and 6.24±0.57 mg/L, indicating a good pollutant removal effect.

In a case using a single-stage A/O wastewater treatment mode, under the condition that the reflux ratio of the aerobic nitrification liquid was 100% (based on the total influent flow rate of the treatment system), a theoretical total nitrogen removal rate could reach 50%, and a minimum reflux ratio of the aerobic nitrification liquid needed to reach 456% in order to obtain a total nitrogen removal rate of at least 82%. According to the present embodiment, the reflux ratios of the invention at the first two stages of aerobic nitrification liquid were both 100% (based on the flow rate of influent entering each reaction unit), i.e., under the condition that the total reflux ratio of the aerobic nitrification liquid was 100% (based on the total influent flow rate of the treatment system), the total nitrogen removal rate reached 82.49±2.36%, and the pre-denitrification nitrogen removal rate could reach about 66%.

The present embodiment shows that the biological nitrogen removal method based on two-stage feeding and three-stage anoxic/aerobic chambers for wastewater treatment can reach an ammonia nitrogen removal rate of 99.51±0.41% under a low-temperature condition without sludge reflux, and well solves the problem of low-temperature nitrification. In the meanwhile, under the condition of lower aerobic nitrification reflux ratio, the utilization rate of the wastewater carbon source and the pre-denitrification efficiency are significantly improved, which greatly reduces the energy consumption required for refluxing of the aerobic nitrification liquid in the system, thereby achieving efficient biological nitrogen removal for urban wastewater.

What is claimed is:

1. A biological nitrogen removal method based on multistage feeding and multistage anoxic/aerobic (A/O) chambers for wastewater treatment at a low temperature, adopting a constant flow operation mode, the method comprising:
   enabling influent subjected to primary treatment to respectively enter a first-stage A/O reaction unit and a second-stage A/O reaction unit from two position points;
   refluxing an effluent from an outlet end of the first-stage A/O reaction unit to an influent end of the first-stage A/O reaction unit;
   refluxing an effluent from an outlet end of the second-stage A/O reaction unit to an influent end of the second-stage A/O reaction unit; and
   clarifying, separating and discharging an effluent from an outlet end of a third-stage A/O reaction unit, wherein the low temperature is no more than 15° C.,
   the first-stage A/O reaction unit comprises four sequentially connected biofilm reactors, including: an A1 anoxic influent carbon source denitrification reactor an A2 anoxic influent carbon source denitrification reactor an O3 aerobic organic matter degradation reactor; and an O4 aerobic nitrification reactor,
   the second-stage A/O reaction unit comprises four sequentially connected biofilm reactors, including: an A5 anoxic influent carbon source denitrification reactor an A6 anoxic influent carbon source denitrification reactor an O7 aerobic organic matter degradation reactor; and an O8 aerobic nitrification reactor,
   the third-stage A/O reaction unit comprises two sequentially connected biofilm reactors, including: an A9 anoxic external carbon source denitrification reactor; and an O10 aerobic residual organic matter degradation and nitrification reactor, a carbon source adding device being disposed in the A9 anoxic external carbon source denitrification reactor,
   suspended biofilm carriers are disposed in all of the reactors,
   in the anoxic reactors of the first-stage A/O reaction unit and the A/O second-stage reaction unit, facultative heterotrophic biofilms attached to surfaces of the suspended biofilm carriers remove nitrate nitrogen through influent carbon source denitrification,
   in the first-stage A/O reaction unit and the second-stage A/O reaction unit, in the aerobic reactors for organic matter degradation, aerobic heterotrophic biofilms attached to surfaces of the suspended biofilm carriers remove organic matters in wastewater,
   in the aerobic reactors for nitrification, aerobic autotrophic biofilms attached to surfaces of the suspended biofilm carriers remove organic nitrogen and ammonia nitrogen in wastewater, and
   in the third-stage A/O reaction unit, nitrate nitrogen is removed by adding an external carbon source according to a total nitrogen discharge criterion for finally treated outlet water, so that the organic matters, total nitrogen and ammonia nitrogen of the finally treated outlet water reach the water quality indexes.

2. The biological nitrogen removal method according to claim 1, wherein a reflux ratio of refluxing the effluent from the outlet end of the first-stage A/O reaction unit to the influent end of the first-stage A/O reaction unit is 50% to 200%.

3. The biological nitrogen removal method according to claim 1, wherein a reflux ratio of refluxing the effluent from the outlet end of the second-stage A/O reaction unit to the influent end of the second-stage A/O reaction unit is 50% to 200%.

4. The biological nitrogen removal method according to claim 1, wherein a total retention time of the first-stage A/O reaction unit, the second-stage A/O reaction unit, and the third-stage A/O reaction unit is 6 h to 12 h, and a maximum flow velocity at a cross section of each of the reactors is not higher than 35 m/h.

5. The biological nitrogen removal method according to claim 1, wherein a filling rate of the suspended biofilm carriers in each of the anoxic reactors is not higher than 55%.

6. The biological nitrogen removal method according to claim 1, wherein a filling rate of the suspended biofilm carriers in each of the aerobic reactors is not higher than 66%.

7. The biological nitrogen removal method according to claim 1, wherein the reactors are each equipped with an effluent suspended biofilm carrier interception device, and the effluent suspended biofilm carrier interception device is an interception screen.

8. The biological nitrogen removal method according to claim 7, wherein a screening flow velocity of the interception screen is not higher than 60 m/h, an open area of the interception screen is not higher than 50%, and a mesh size of the interception screen is 50% to 60% of a diameter of the suspended biofilm carriers.

\* \* \* \* \*